United States Patent [19]

Stitt et al.

[11] 4,112,475
[45] Sep. 5, 1978

[54] D-C MOTOR FLASHOVER PROTECTION

[75] Inventors: Thomas Detlor Stitt; Dennis Francis Williamson, both of Erie, Pa.

[73] Assignee: General Electric Company, Erie, Pa.

[21] Appl. No.: 753,406

[22] Filed: Dec. 22, 1976

[51] Int. Cl.² ............................................. H02H 7/09
[52] U.S. Cl. ....................................... 361/33; 322/28; 322/64; 361/30
[58] Field of Search ....................... 361/33, 30, 23, 31, 361/91, 88, 20, 21; 322/28, 68, 64, DIG. 2; 318/423, 424, 521, 525, 532

[56] References Cited

U.S. PATENT DOCUMENTS

| 560,503 | 5/1896 | Ihlder | 361/23 |
|---|---|---|---|
| 1,239,795 | 9/1917 | Klipphahn | 361/23 |
| 1,602,743 | 10/1926 | Benson | 361/23 X |
| 3,368,109 | 2/1968 | Johansson | 322/68 X |
| 4,019,120 | 4/1977 | Fattic | 322/28 |

Primary Examiner—Patrick R. Salce
Attorney, Agent, or Firm—James H. Beusse

[57] ABSTRACT

A method and apparatus for detecting and correcting the occurrence of flashover in a direct current electric motor. The polarity and magnitude of voltage on the field winding of the motor is continuously monitored. Detection of a sudden reversal of the polarity of the field voltage accompanied by a rapid increase in magnitude results in the generation of a flashover signal. The flashover signal is coupled to power controlling elements regulating power supplied to the motor and is effective to force removal of power from the motor. In a preferred embodiment the apparatus is disclosed in a two-motor system with two field windings serially connected such that the field voltage monitoring is accomplished on a differential basis.

10 Claims, 5 Drawing Figures

D-C MOTOR FLASHOVER PROTECTION

BACKGROUND OF THE INVENTION

The present invention relates to protection systems for dynamoelectric machines and, more particularly, to a method and protection system for detecting and correcting flashovers in a direct current electric traction motor.

In direct current electric traction motors carbon brushes rubbing on commutator bars are utilized to provide current to armature windings of the motor. This current establishes a magnetic field in the armature and corresponding magnetic poles. The magnetic poles created in the armature interact with magnetic poles in field windings of the motor to produce torque in the machine. The magnetic poles in the field windings of the motor are established by means of direct current flowing through these windings. The motor includes a plurality of commutator bars equally spaced around one end of the armature, each of the commutator bars being connected to selected windings of the armature for establishing the magnetic poles. As the carbon brushes pass over the commutator bars they will periodically short circuit adjacent bars thus short circuiting armature windings connected to the particular commutator bars. Since the windings associated with the short circuited commutated bars are displaced from each other, they will be passing through flux fields created by the magnetic poles of the field winding which are of different magnitudes. Accordingly, there will exist a difference in potential between the two commutator bars. In the design of an ideal machine the brushes are located between field poles at a point at which flux created by the field poles passes through zero in its reversal between adjacent poles of opposite magnetic polarity. This ideal point shifts with changes in armature current since the total flux is the sum or field flux and armature flux. Typically, a commutating pole or interpole is put between adjacent field poles, the commutating poles having a winding which is serially connected in an armature current path so that the flux generated by the commutating pole is proportional to armature current. This method generally serves to minimize changes in the interpole flux thus allowing the brush to transfer current between commutator bars without an undue amount of arcing.

For motors which are subject to heavy overloads, rapidly changing loads, operation with weak main fields, defective brushes, brush bounce or rough commutators, there is a possibility that the commutating pole action may be insufficient and a simple sparking at the brushing may become a major arc. For example, at the instant that an armature coil is located at the peak of a badly distorted flux wave, the coil voltage may be high enough to break down the air between the adjacent segments to which the coil is connected and result in flashover, or arcing, between the segments. Flashing between segments may quickly spread around the entire commutator and, in addition to its possible destructive effects on the commutator, constitutes a short circuit on the power line.

In series connected d-c machines there is a certain degree of self protection against transients caused by arcing or flashovers in that the series field acts as an inductor to limit the rate of rise of armature current. The inductive voltage thus generated causes rapid flux changes to limit quickly the value of armature current, and the transient flux change transforms in voltage into the commutating armature coils being commutated that is in a direction to assist commutation. In addition, a series motor may also include a flash ring surrounding the commutator, the flash ring being connected to a ground potential. When a flashover occurs the arc will spread to the flash ring which results in a ground being applied at the armature connected terminal of a series connected winding. Since the other terminal of a field winding is normally connected to ground potential, this results in the field being short circuited to ground thereby removing the excitation from the series wound machine.

In shunt wound or separately excited motors the fact that the flashover is grounded does not result in the excitation being removed from the field winding since the separate field is still connected directly to the power supply. Accordingly, some method of detecting a flashover and for providing corrective action to eliminate flashover must be provided in order to prevent damage to the machine. Prior art systems for detecting flashover have generally involved systems responsive to current in the motor for correcting a flashover condition. For example, a typical system utilizes a differential relay which detects the difference between input and output currents to the system and then trips when this difference exceeds a particular selected value. This type of system is sensitive to current losses caused by short circuits to the aforementioned flash ring. Obviously such a detection system is inappropriate for an ungrounded or "floating" motor. Such systems are illustrated in U.S. Pat. Nos. 1,580,810 and 1,602,743. Other systems have been proposed in which the sensing would be based on some maximum level of field current or some maximum level or armature current. Although these prior systems have been successful in detecting and correcting flashover conditions, the reaction time of such systems has been such that extensive damage may have already been caused to the machine by the time that the system is effective to remove power to the motor. Furthermore, in some instances current does not increase and may even decrease during a flashover.

It is an object of the present invention to provide an improved flashover detection and correction system which responds rapidly to the initiation of the flashover to correct the flashover condition before damage occurs to the motor.

SUMMARY OF THE INVENTION

The present invention provides a flashover detection and correction system for a direct current electric motor which monitors voltage changes across the motor field winding in order to rapidly detect the initiation of a flashover condition. The system is based on the discovery that the voltage of the field rapidly reverses prior to any significant current change in the field as a result of a flashover initiation. By detecting this sudden reversal of field voltage polarity the system can effectively remove power to the field and alleviate the flashover condition prior to the initiation of a sustained flashover. In a preferred embodiment the system includes both field voltage and field current monitoring. The field current monitoring arrangement responds to the magnitude and the rate of change of field current to provide an indication of flashover. Both the field voltage and the field current monitoring arrangements are adapted to remove excitation from the motor in order to rapidly terminate the flashover.

BRIEF DESCRIPTION OF THE DRAWINGS

For a better understanding of the present invention, reference should be made to the following detailed description taken in conjunction with the accompanying drawings in which.

DETAILED DESCRIPTION

Figure 1:
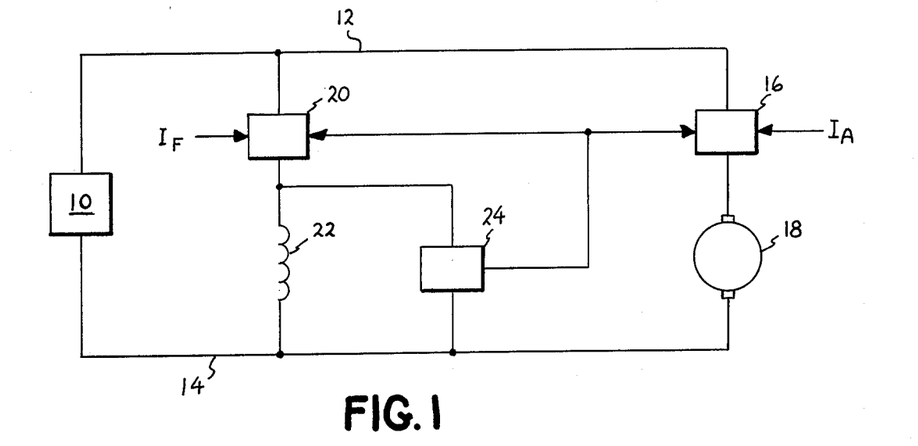
FIG. 1 is a simplified block diagram of a motor control system incorporating the present invention.

Referring now to FIG. 1 there is shown a simplified block diagram of a direct current motor power control system embodying the teaching of the present invention. A d-c power source 10 is connected to supply direct current power to a positive power buss 12 and a negative power buss 14. A current regulator 16 serially connects the armature 18 of a separately excited traction motor between the power busses 12 and 14. A second current regulator 20 serially connects a field winding 22 of the traction motor between power buss 12 and 14. A voltage monitoring device 24 is connected in parallel with field winding 22 and is responsive to a reversal of voltage across the field winding for providing a flashover detection signal to the current regulators 16 and 20. The voltage monitoring device preferably comprises a voltage isolating circuit such as, for example, very high impedance resistors or an optoisolator circuit. The signal coupled through the voltage isolating circuit is applied to a voltage comparator which senses polarity and magnitude of the signal. The comparator produces the flashover detection signal when the polarity of the coupled signal reverses and its magnitude reaches a predetermined level.

The current regulators 16 and 20 may be identical devices each responsive respectively to a commanded armature current signal $I_A$ and a commanded field current signal $I_F$ for regulating the current in the respective armature and field to the commanded values. The commanded armature current signal $I_A$ and the commanded field current signal $I_F$ may be supplied by means well known in the art in response to an operator's demand for speed or torque of the motor. The flashover detection signal from voltage monitoring device 24 is applied to the current regulators 16 and 20 whereby upon receipt of this signal the regulators 16 and 20 whereby upon receipt of this signal the regulators are effective to terminate current flowing therethrough and into the respective armature and field winding. Clearly the flashover detection arrangement of FIG. 1 is also applicable to a series connected motor, i.e., a motor in which the field and armature are in the same series current path.

Figure 2:
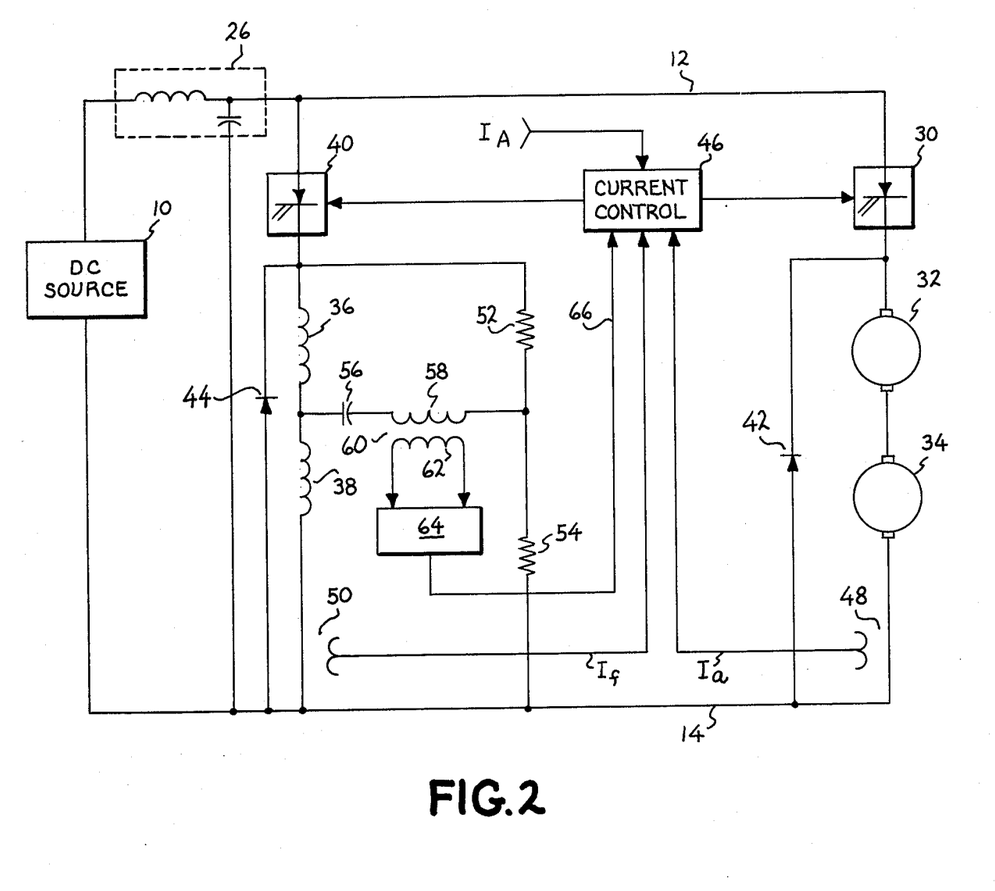
FIG. 2 is a simplified partial schematic of a motor control system illustrating one form of the inventive flashover detection system.

Referring now to FIG. 2 there is shown a simplified diagram of a separately excited motor system in which two separately excited series connected motors are arranged between positive and negative voltage busses 12 and 14. D-C power source 10 supplies power to busses 12 and 14 through a line filter 26. A first current regulator 30 serially connects motor armatures 32 and 34 between busses 12 and 14. If desired, a motor smoothing reactor may be connected in series with armatures 32 and 34. Motor field windings 36 and 38 associated respectively with armatures 32 and 34, are serially connected by a second current regulator 40 between busses 12 and 14. As illustrated, the current regulators 30 and 40 are preferably chopper circuits of a type well known in the art such as, for example, the chopper circuit shown and described in section 13.2.4 of the SCR Manual, fifth edition, published in 1972 by the General Electric Company, Semiconductor Products Department, Schenectady, N.Y.

As described in the referenced SCR Manual, the chopper circuits regulate current by alternately switching between conducting and non-conducting states. In FIG. 2 during the conducting state of current regulator 30, current is supplied from d-c source 10 through filter 26 and the current regulator 30 to the motor armatures 32 and 34. During the non-conducting state of current regulator 30, current through the motor armatures 32 and 34 circulates in a closed path through a free wheeling diode 42. By periodically gating the current regulator 30 into conduction the current can be built up to some level in the armatures 32 and 34 and then during the non-conducting state of current regulator 30 the current continues to circulate through the free wheeling diode 42 thus establishing an average magnitude of current in the motor armatures. Similarly, the current regulator 40 is periodically gated into conduction for some predetermined time period during which current builds to a predetermined magnitude in the field windings 36 and 38. During the non-conducting state of current regulator 40, current continues to circulate through the field windings 36 and 38 and the free wheeling diode 44 in a manner similar to the operation described with reference to armatures 32 and 34. Accordingly, some average magnitude of field current is established through the field windings 36 and 38.

Control of the current regulators 30 and 40 is effected by current control circuit 46 of a type well known in the art which supplies controlled gating signals to the current regulators 30 and 40 in a manner to control the ratio of the conducting to non-conducting time periods of these regulators. A current control circuit suitable for providing gating control signals to current regulators 30 and 40 is shown in U.S. Pat. No. 3,866,098 — Weiser issued Feb. 11, 1975 and assigned to the General Electric Company. Current control circuit 46 controls the current in armature 32 and 34 in response to an input current command signal $I_A$. The current control circuit 46 compares the input command signal $I_A$ to a feedback signal $I_a$ produced by a current measuring reactor (CMR) 48. The current feedback signal $I_a$ is representative of the actual magnitude of current through the armatures 32 and 34. The current control circuit 46 is effective to adjust the conduction time of current regulator 30 in a manner to minimize the difference between the commanded current signal $I_A$ and the feedback current signal $I_a$. Similarly, the current control circuit 46 compares a feedback signal $I_f$ generated by a CMR 50 connected to monitor the current flowing through field windings 36 and 38 in order to regulate the current in field windings 36 and 38 to a desired average magnitude.

The inventive flashover detection system comprises a circuit for monitoring the voltage across the two series connected motor fields 36 and 38 and for providing an output signal when a flashover occurs. This detection circuit includes two serially connected resistors 52 and 54 which are connected between the junction intermediate current regulator 40 and field winding 36 and the negative voltage buss 14. The junction intermediate field windings 36 and 38 is connected through a capacitor 56 and a primary winding 58 of a pulse transformer 60 to the junction intermediate the resistors 52 and 54. A secondary winding 62 of pulse transformer 60 is connected to input terminals of a pulse detection circuit 64. The pulse detection circuit 64 provides an output signal via line 66 to the current regulator circuit 46. The signal on line 66 is effective to force the current regulator circuit 46 to immediately terminate the conduction cycles of current regulators 30 and 40 thereby removing excitation from both the armatures 32 and 34 and the field windings 36 and 38 of the two motors.

The operation of the detection circuit of FIG. 2 relies upon the sudden change in field voltage occasioned by flashover of the armature circuit. This flashover couples into the field circuit in such a manner that the field windings 36 and 38 attempt to produce sufficient current to maintain the flux in the motor being subjected to a flashover to the same level as was present in the motor prior to the initiation of a flashover condition. Accordingly, the current through the motor field associated with the flashing motor increases. As will be apparent the increase in current will result in a reversal of the voltage across the field winding associated with the flashing motor. This voltage reversal occurs because the field winding is now attempting to supply current at a level higher than was being supplied to the field prior to the flashing condition. This voltage reversal will be coupled through the capacitor 56 and into the primary winding 58 of pulse transformer 60 and thus into the secondary winding 62 from whence it is applied to the pulse detection circuit 64. Pulse detection circuit 64 may be any of the well known types of voltage pulse detectors such as, for example, a voltage comparator.

Figure 3:
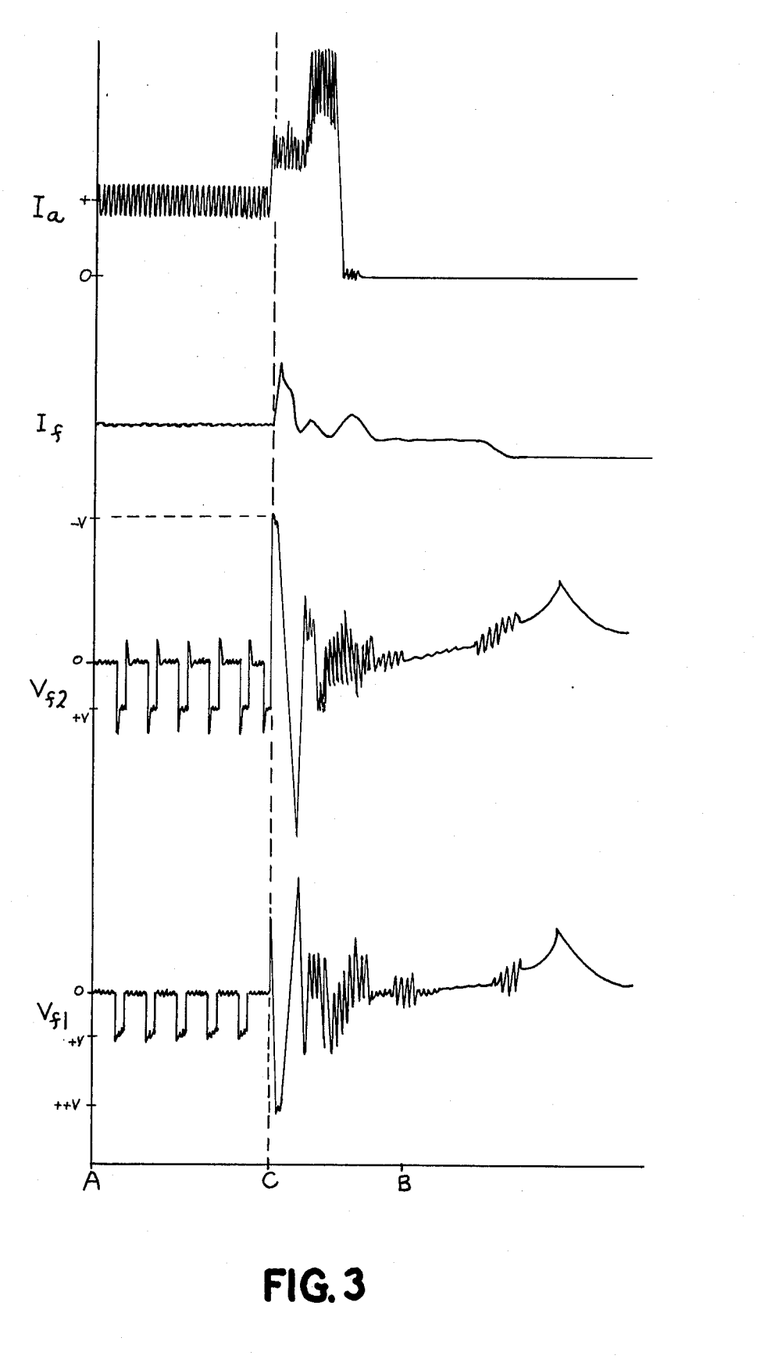
FIG. 3 is a graph of voltages and currents in a flashing motor.

Referring now to FIG. 3 there is shown a series of waveforms typical of those existing in a direct current traction motor when a flashover occurs. The waveforms illustrated in FIG. 3 were taken from a pair of motors connected in a power control system of the type shown in FIG. 2 using a Honeywell type 1858 CRT Visicorder connected for monitoring armature current, field current and field voltage. The first waveform marked $I_a$ represents armature current through the two motor armatures 32 and 34. The second waveform identified as $I_f$ represents field current through the field windings 36 and 38. The third waveform marked $V_{f2}$ represents the voltage appearing across field winding 36. The lower waveform marked $V_{f1}$ represents the voltage appearing across field winding 38. The time period between lines A and B is approximately 100 milliseconds. As can be seen, at time C a flashover occurred and the armature current $I_a$ rose rapidly from a nominal 400 ampere level to approximately 800 amperes. This created a sudden rise in field current as shown in the waveform marked $I_f$ and a reversal and much more rapid rise in the voltage $V_{f2}$ appearing across the field winding 36. Since field windings 36 and 38 are connected in series the volatage appearing across winding 36 is also applied to winding 38 as is shown by the waveform marked $V_{f1}$.

Referring again to FIG. 2, the pulse detection circuit 64 provides a flashover signal to current control circuit 46 which effects the rapid turn off of the current regulators 30 and 40. As a result the external excitation to both the armatures 32 and 34 and the fields 36 and 38 is removed and the armature current $I_a$ begins to decrease almost immediately after flashover occurs. Simultaneous with this the field current $I_f$ also decreases rapidly. By reference to FIG. 3, the changes in both $I_a$ and $I_f$ can be seen. A secondary effect occurs as the armature rotates and a secondary flashover occurs forcing armature current $I_a$ again to a high level. The length of time that this secondary effect lasts is very short and the armature current rapidly decays after the secondary effect to substantially zero. It will be noted that the secondary effect also causes a slight rise in field current due to the induced voltages in the field windings. However, field current also decays rapidly through the free wheeling diode 44. On the graph of FIG. 3 it will be appreciated that the duration of the flashover condition is minimized by the rapid detection circuit provided in the present invention. For example, the total length of time from beginning of the flashover until the armature current $I_a$ has decayed substantially to zero is approximately 25 milliseconds. By empirical testing it has been found that damage to the motor will occur if the arcing is sustained for a period longer than 100 milliseconds. The inventive system detects and corrects for flashover conditions in a substantially shorter time and thus prevents damage from occurring to the motor itself.

Figure 4:
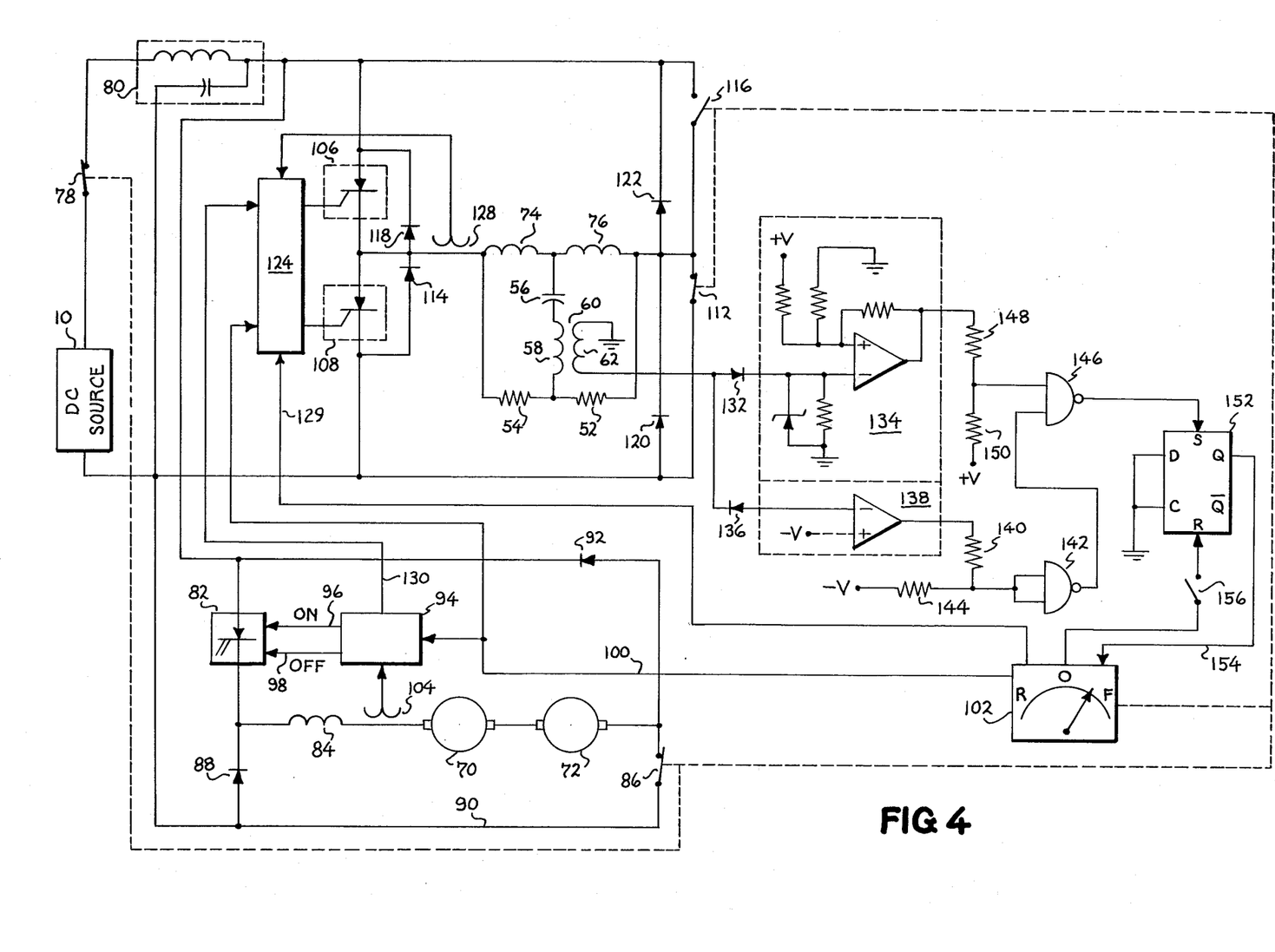
FIG. 4 is a more detailed schematic of one embodiment of the inventive flashover detection system.

Referring now to FIG. 4, there is shown a more detailed diagram of a traction motor system for an electrically propelled vehicle incorporating the teachings of the present invention. In this system the traction motors comprise motor armatures 70 and 72 and their associated field windings 74 and 76, respectively. Motor armatures 70 and 72 are supplied with direct current power from d-c source 10 via a line breaker 78, a line current filter 80, a chopper circuit 82, and a motor smoothing reactor 84. A braking contactor 86 is serially connected in the current return path between the armatures 70 and 72 and a negative voltage buss 90. A free wheeling diode 88 connected between negative voltage buss 90 and motor smoothing reactor 84 provides a current free wheeling path during the non-conducting time of chopper circuit 82. During regenerative or dynamic braking when braking contactor 86 is open, the regenerative braking current flows through free wheeling diode 88, motor reactor 84, the motor armatures 70 and 72 and through a braking diode 92 back to the positive voltage terminal of d-c source 10. Current through the motor armatures 70 and 72 is regulated by controlling the duty factor of chopper circuit 82 in a manner well known in the art. A logic circuit 94 provides ON commands via line 96 and OFF commands via line 98 to the chopper circuit in order to control the frequency and duty factor of chopper circuit 82. Logic circuit 94 is responsive to a commanded current signal via line 100 from a master control circuit 102 to regulate the current supplied to armatures 70 and 72. This regulation is attained by comparing the actual current flowing in the motor armatures 70 and 72 with the command current and controlling the duty factor of chopper circuit 82 in a manner to minimize this difference. The actual motor current is determined by a current measuring reactor (CMR) 104 which supplies a signal to logic circuit 94 proportional to the actual current flowing in the armatures 70 and 72.

The motor field windings 74 and 76 are connected in a bridge type circuit similar to the circuit utilized for energizing the motor armature 70 and 72. However, in the field winding circuit two thyristor circuits 106 and 108 are utilized in order to provide bidirectional current flow through the motor field windings so that the traction motors may be caused to rotate in either a clockwise or counterclockwise direction. For clockwise rotation power is supplied to field windings 74 and 76 through line breaker 78, line current filter 80, and thyristor circuit 106. The current return path from field winding 74 and 76 during the clockwise rotation is through a direction contactor 112 back to the negative terminal of d-c source 10. During this clockwise rotation of the traction motors the current free wheeling path during the non-conducting time of thyristor circuit 106 is provided through the free wheeling diode 114, the field winding 74 and 76, and the direction contactor 112.

For counterclockwise rotation of the traction motors the current path is provided through line breaker 78, filter 80, direction contactor 116, the motor field windings 74 and 76 and through thyristor circuit 108. During the non-conducting time of thyristor circuit 108, the free wheeling path is through the direction contactor 116, the field windings 74 and 76, and a free wheeling diode 118. In order to minimize arcing of the contactors 112 and 116 if they are opened during any time at which current is still flowing through the field windings 74 and 76, each of the contactors 112 and 116 is shunted by a diode 120 and 122, respectively.

A more detailed diagram and description of thyristor circuits suitable for use as the circuits 106 and 108 in combination with motor field windings is shown in co-pending U.S. application Ser. No. 641,846, filed Dec. 18, 1975 and assigned to the General Electric Company.

The thyristor circuits 106 and 108 are controlled by a current regulator 124. The current regulator 124 is responsive to the commanded current signal on line 100 and an actual current signal from a CMR 128. Controller 102 supplies a direction command signal via line 129 to current regulator 124 in order to determine which of the thyristor circuits 106 or 108 will be utilized to control the direction of current through motor field windings 74 and 76. In addition a field weakening signal is provided via line 130 from current regulator 94 to the current regulator 124. As is well known in the art the field weakening signal may be utilized to increase the speed of the motors above the motor corner point or to modify the horsepower curve of the motors according to some predetermined function. The construction of current regulators 94 and 124 is well known in the art and may be, for example, of the type described in U.S. Pat. No. 3,866,098 identified supra.

As will be apparent the thyristor circuits 106 and 108 operate as main and commutating thyristors with interchangeable roles. For clockwise rotation of the motors, thyristor circuit 106 operates as the main current carrying thyristor circuit and thyristor circuit 108 is momentarily gated into conduction when it is desired to commutate off thyristor circuit 106. Conversely, for counterclockwise rotation, thyristor circuit 108 operates as the main current carrying thyristor circuit and thyristor circuit 106 is momentarily gated on when it is desired to commutate off thyristor circuit 108. Current regulator 124 thus contains logic circuitry responsive to the direction command signal from controller 102 for determining which of the thyristor circuits 106 and 108 will operate as main and commutating thyristor circuits.

The inventive flashover detection circuit comprises the two resistors 52 and 54 serially connected in parallel with the motor field windings 74 and 76. The d-c blocking capacitor 56 and the primary winding 58 of pulse transformer 60 are serially connected between the junction intermediate field windings 74 and 76 and the junction intermediate the resistors 52 and 54. The secondary winding 62 of pulse transformer 60 has a first terminal connected to a negative or ground potential and a second terminal connected through a first diode 132 to a first voltage comparator 134 and through a diode 136 to a second voltage comparator 138. As will be apparent the pulse developed by pulse transformer 60 may be either a positive going or a negative going pulse depending upon which of the fields 74 or 76 are associated with the flashing motor. A positive going pulse will be conducted via diode 132 into comparator 134 where it will be compared to a positive voltage level in order to generate a pulse out of the comparator 134 if the amplitude of the flashover signal produced by pulse transformer 60 exceeds the set point of the comparator 134. Similarly, if the pulse transformer develops a negative pulse, this pulse will be conducted via line 136 into comparator 138 which, although not shown in detail, is substantially the inverse identity of comparator 134 and compares the negative voltage pulse to a negative voltage level to provide an output signal if the negative voltage pulse exceeds a predetermined negative set point. The output terminal of comparator 138 is connected through a first resistor 140 to both the first and second input terminals of a NAND gate 142 which inverts the signal produced by comparator 138. The output signal from NAND gate 142 is normally held at a logic one level by means of a negative voltage applied through a resistor 144 to the input terminals of NAND gate 142. The output terminal of NAND gate 142 is connected to a first input terminal of a NAND gate 146. A second input terminal of NAND gate 146 is connected through a resistor 148 to the output terminal of comparator 134. This second input terminal of NAND gate 146 is normally held at a positive or logic one level by means of a positive voltage applied through a resistor 150 to the second input terminal. The output terminal of NAND gate 146 is connected to a set terminal of a D-type flipflop 152. As can be seen the D input terminal and the clock or C input terminal are both connected to ground potential whereby the receipt of a set signal will cause the Q output terminal of flipflop 152 to immediately go to a set or logic one condition. The Q output terminal is connected via line 154 to the master controller 102.

The master controller 102 also controls the power contactors in this system, such as for example, the line breaker contactor 78, the brake contactor 86, and the reversing contactors 112 and 116. This control of these respective contactors is indicated by dashed line from controller 102 to each of these above enumerated contactors. Controllers such as 102 are well known in the art and are presently in use in many transit vehicle or locomotive type electrically controlled vehicles. Additional details of a chopper regulated traction motor system utilizing a master controller such as 102 may be had by reference to the aforementioned U.S. Pat. No. 3,866,098. Further details of a motor control system such as that illustrated in FIG. 4 may also be had by reference to the aforementioned U.S. patent application Ser. No. 641,846 filed Dec. 18, 1975 and assigned to the General Electric Company.

In the operation of the system as illustrated in FIG. 4, the master controller 102 is set by a vehicle operator to some desired level of current or speed and a desired direction of travel. The master controller responds by providing a desired current signal to the current regulators 94 and 124. In addition, a direction signal is applied to the current regulator 124 to determine which of the thyristor circuits 106 and 108 will act as main and commutating thyristor circuits to control the direction of motor rotation. The controller 102 also provides commands to the contactors 78, 86, 112 and 116 to place them in the proper position for forward or reverse motoring or braking. As previously indicated the controls are shown in condition for clockwise rotation of the motors and assumed forward travel of the vehicle. Accordingly, the line breaker 78 is closed, brake contactor 86 is closed, and direction contactor 112 is closed. Chopper circuit 82 is operated to establish some desired current level in the armature 70 and 72 and the thyristor circuit 106 is similarly operated to establish some desired level of field current in the field winding 74 and 76. Consider now the situation wherein a flashover occurs on armature 70. This flashover will result in a sudden reversal of the voltage on field winding 74. This voltage reversal will result in a positive voltage pulse being produced at the junction intermediate winding 74 and 76. The voltage pulse will be coupled through capacitor 56 and the primary winding 58 of pulse transformer 60. From the primary winding 58 of transformer 60 the pulse will be coupled to secondary winding 62 then through diode 132 into voltage comparator 134. When the generated flashover voltage exceeds yhe set point of comparator 134, a negative going pulse will be generated at the output terminal of comparator 134 and will result in a logic zero being applied to the second input terminal of NAND gate 146. This logic zero will force the output of NAND gate 146 to a logic one level thus applying a set pulse to flipflop 152. In response to the set pulse, flipflop 152 will produce a logic one or positive level signal at the Q output terminal which will then be applied via line 154 to the master controller 102. In a preferred embodiment the signal on line 154 overrides the setting of master controller 102 forcing all output signals to zero levels. This immediately forces the current regulators 94 and 124 to command a zero current level for their respective chopper circuits. At the same time all the power contactors 78, 86, 112, and 116 are open circuited. This action thus causes the current in both the field and armature circuits to decay at the fastest possible rate. Preferably, in order to restart or reset the motor system to its normal state, a signal is applied from master controller 102 through a manual reset switch 156 to a reset terminal of flipflop 152. This manual reset requirement assures that the flashover is extinguished before the system is again placed in a motoring or braking mode.

Figure 5:
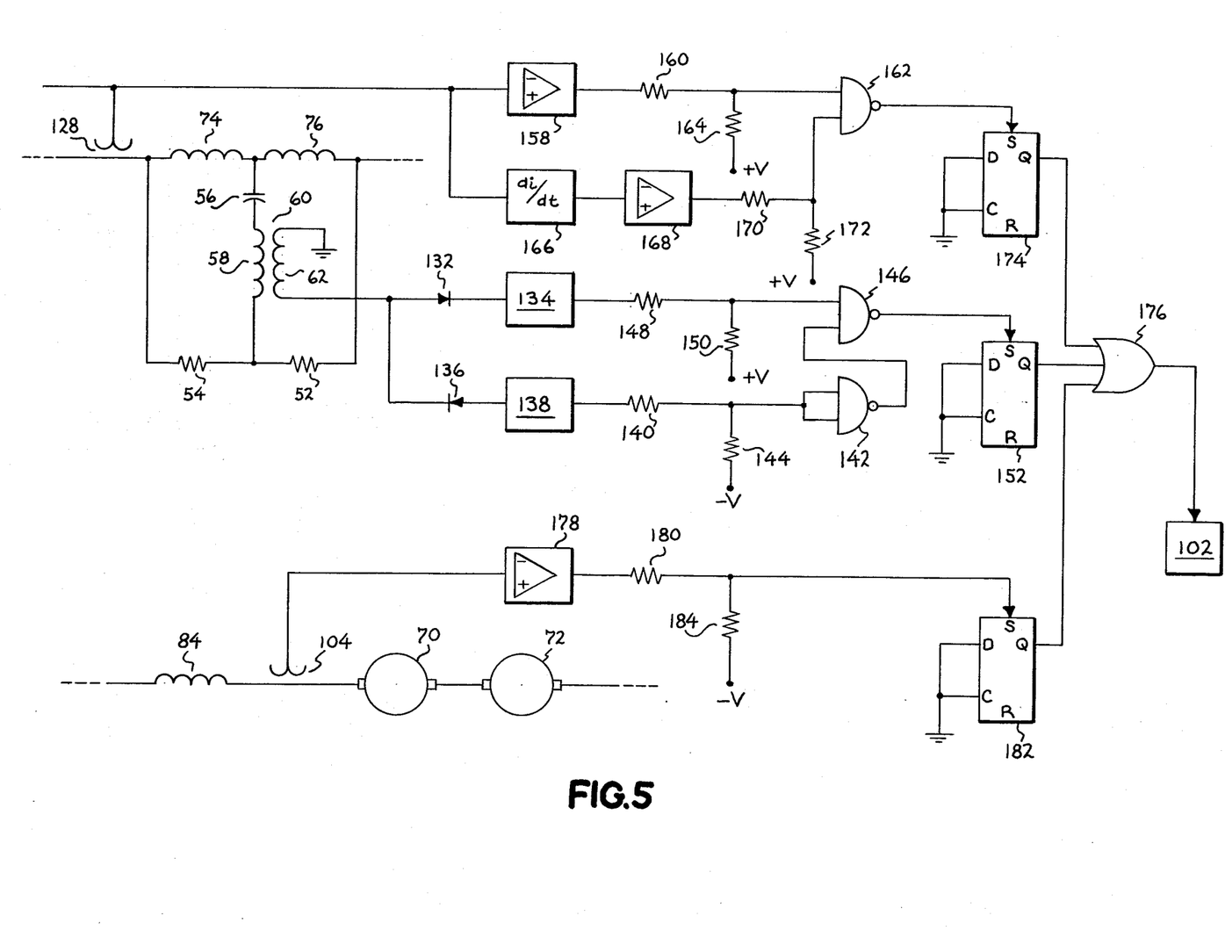
FIG. 5 is a modification of FIG. 4 incorporating additional methods of flashover detection.

Referring now to FIG. 5 there is shown a further modification of the system of FIG. 4 incorporating additional advantageous features of the present invention. In addition to the inventive pulse transformer voltage detecting system for monitoring flashovers on the fields 74 and 76 the system further includes a voltage comparator 158 connected for monitoring the amplitude of the signal produced by the current measuring reactor 128. This voltage comparator 158 may be identical to the voltage comparator 134 illustrated in FIG. 4. The output terminal of voltage comparator 158 is connected through a resistor 160 to a first input terminal of a NAND gate 162. This first input terminal of NAND gate 162 is normally biased to a positive or logic one level by a positive voltage applied through a biasing resistor 164 to the first input terminal. The output signal developed by current measuring reactor 128 is also connected through a differentiator circuit 166 to a second voltage comparator 168. The differentiator circuit 166 produces an output signal proportional to the rate of change of the current signal developed by the CMR 128. In some instances the rate of change may be such that it will produce a voltage of magnitude sufficient to trip the voltage comparator 168 prior to the amplitude of the CMR signal being sufficient to trigger the comparator 158. The output of comparator 168 is connected through a resistor 170 to a second input terminal of NAND gate 162. As with the first input terminal the second input terminal is similarly biased to a positive or logic one level by a positive voltage applied through a biasing resistor 172. The comparators 158 and 168 are selected such that an increase in the amplitude of the signal produced by the CMR 128 or a rapid rate of rise of the signal produced by CMR 128 will cause the output signals at the output terminals of comparators 158 and 168 to go to a negative voltage level. If either of these comparators produce a negative voltage signal, that signal will be conducted through the respective resistors 160 and 170 to the input terminals of NAND gate 162. A negative voltage signal on either input terminal will cause the output of NAND gate 162 to become a positive voltage level signal. The output terminal of NAND gate 162 is connected to a set terminal of a D type flipflop 174, flipflop 174 being identical to the previously described flipflop 152. The Q output terminal of flipflop 174 is connected to a first input terminal of an OR gate 176. A second input terminal of OR gate 176 is connected to the Q output terminal of flipflop 152.

The system of FIG. 5 also includes apparatus for providing a flashover signal in response to excessive armature current. In particular the CMR 104, which monitors and provides an output signal proportional to the armature current in motor armatures 70 and 72, has an output terminal connected to an input terminal of a voltage comparator 178. An output terminal of voltage comparator 178 is connected through a resistor 180 to a set terminal of a D-type flipflop 182 which is identical to the previously described flipflop 152. The signal at the set input terminal of flipflop 182 is normally maintained at a logic zero or negative voltage level by a negative voltage applied through a resistor 184 to the set input terminal. A Q output terminal of flipflop 182 is connected to a third input terminal of OR gate 176. Obviously if any one of the flipflops 152, 174 or 182 is set by a signal from any of the comparators 134, 138, 158, or 178 a signal will then be applied from the OR gate 176 to master controller 102. In this embodiment the master controller 102 responds to excessive field current or excessive rate of rise of field current or excessive armature current in addition to the reversal of voltage on either of the field windings 74 or 76 to open the power contactors 78, 86, 112, and 116 described in FIG. 4. Furthermore, as previously described, the controller 102 in response to the signal from OR gate 176 will also commutate off the thyristor circuits supplying power to the armatures 70 and 72 and the field windings 74 and 76 thus terminating the external supply of power to these devices. Accordingly, a rapid rate of decrease of current supplied to the traction motors is achieved.

As will be apparent there has been disclosed a flashover protection circuit for a direct current electric traction motor which rapidly removes power from the system at a very early stage during the initiation of a flashover condition by detection of voltage reversal on the motor field winding. As illustrated in the graphs of FIG. 3, the system causes the flash to rapidly dissipate prior to any damage to the motor having occurred. Although the inventive system has been described as applied to a separately excited shunt wound traction motor, it will be appreciated that the system is equally applicable to a series wound traction motor or to a compound wound traction motor.

While the principles of the invention have now been made clear in an illustrative embodiment there will be immediately obvious to those skilled in the art many modifications in construction and arrangement used in the practice of the invention which are particularly adapted for specific environments and operation requirements without departing from these principles. The appended claims are therefore intended to cover and embrace any such modifications, subject only to the true spirit and scope of the invention.

What is claimed and desired to be secured by Letters Patent of the U.S. is:

1. A protection system for a direct current electric traction motor, said motor having armature and field means adapted for receiving direct current electric power from a direct current power source, said system comprising:
   a. regulating means interconnecting said motor current path;
   b. detection means connected for monitoring the polarity and magnitude of voltage on said field means, said detection means being responsive to rapid reversal of said polarity for producing a flashover signal; and
   c. means coupling said flashover signal to said regulating means, said regulating means being responsive to said flashover signal for interrupting said motor current path.

2. The system of claim 1 wherein said regulating means comprises:
   a. first means connected in said motor current path for controlling the flow of current therethrough;
   b. second means responsive to a commanded magnitude of current for applying control signals to said first means to thereby regulate motor current to the commanded magnitude; and
   c. third means responsive to said flashover signal for reducing said commanded magnitude of current to zero.

3. The system of claim 2 and including electromechanical switch means interconnecting the source and the motor, said third means being connected to open said switch means in response to said flashover signal.

4. The system of claim 3 wherein said motor is connected in a separately excited arrangement, the regulating means including first means interconnecting the source and the field means and second means interconnecting the source and the armature.

5. The system of claim 4 including first and second direct current electric traction motors, the armatures of said motors being serially connected in a first current path and the field means of said motors being serially connected in a second current path, said detection means comprising:
   a. first and second serially connected resistors connected in parallel circuit arrangement with said field means;
   b. a capacitor and a primary winding of a pulse transformer serially connected between a junction intermediate said field means of said first and second motors and a junction intermediate said first and second resistors;
   c. a voltage comparison circuit; and
   a secondary winding of said pulse transformer being connected to said voltage comparison circuit whereby said flashover signal is produced at an output terminal of said comparison circuit in response to a voltage pulse on said secondary winding exceeding a first predetermined magnitude.

6. The system of claim 5 and including:
   a. means connected in circuit with said field means for providing a first current signal representative of the magnitude of current in said field means;
   b. second comparison means connected for receiving said first current signal, said second comparison means providing a second flashover signal when the rate of change of magnitude of said first current signal exceeds a second predetermined value; and
   c. means for combining said first and second flashover signals to provide a single flashover signal for removing excitation from said motors.

7. The system of claim 6 and including a third comparison means connected for receiving said first current signal, said third comparison means providing a third flashover signal when the magnitude of said first current signal exceeds a third predetermined magnitude, and means for combining said first, second and third flashover signals to provide a single flashover signal for removing excitation from said motors.

8. The system of claim 7 and including:
   a. means connected in circuit with said armatures for providing a second current signal representative of the magnitude of current in said armature;
   b. fourth comparison means connected for receiving said second current signal, said fourth comparison means providing a fourth flashover signal when said second current signal exceeds a fourth predetermined magnitude; and
   c. means for combining said first, second, third and fourth flashover signals to provide a single flashover signal for removing excitation from said motors.

9. A method for detecting a flashover in a direct current electric motor having armature and field means, said method comprising the steps of:
   a. monitoring the polarity and magnitude of voltage on the field means;
   b. detecting a reversal of said polarity;
   c. producing a signal representative of the magnitude of said voltage during said reversal;
   d. comparing said signal to a predetermined reference magnitude; and
   e. producing a flashover signal when said signal exceeds said reference magnitude.

10. A method for protecting a direct current electric motor including the method of claim 9 and the additional step of:
   a. removing power to the motor in response to said flashover signal.

* * * * *

UNITED STATES PATENT AND TRADEMARK OFFICE
CERTIFICATE OF CORRECTION

PATENT NO. : 4,112,475

DATED : Sep. 5, 1978

INVENTOR(S) : T. D. Stitt; D. F. Williamson

It is certified that error appears in the above-identified patent and that said Letters Patent are hereby corrected as shown below:

Col. 11, line 29, after "motor" insert -- and said source to provide a controlled motor --

Col. 12, line 10, insert "d." before -- a --

Signed and Sealed this

Tenth Day of April 1979

[SEAL]

Attest:

RUTH C. MASON
Attesting Officer

DONALD W. BANNER
Commissioner of Patents and Trademarks